US012626078B2

(12) United States Patent
Balmakhtar et al.

(10) Patent No.: US 12,626,078 B2
(45) Date of Patent: May 12, 2026

(54) PASSIVE RFID TAG PLACEMENT FOR CYBERNETIC COMMAND AND CONTROL VIA LOCALIZATION

(71) Applicant: T-Mobile Innovations LLC, Overland Park, KS (US)

(72) Inventors: Marouane Balmakhtar, Fairfax, VA (US); Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 146 days.

(21) Appl. No.: 18/416,709

(22) Filed: Jan. 18, 2024

(65) Prior Publication Data

US 2025/0238642 A1    Jul. 24, 2025

(51) Int. Cl.
| | |
|---|---|
| *G06K 7/10* | (2006.01) |
| *G05D 1/244* | (2024.01) |
| *G06K 7/00* | (2006.01) |
| *G05D 101/15* | (2024.01) |
| *G05D 107/70* | (2024.01) |
| *G05D 111/30* | (2024.01) |

(52) U.S. Cl.
CPC ....... *G06K 7/10445* (2013.01); *G05D 1/2446* (2024.01); *G06K 7/0008* (2013.01); *G06K 7/10158* (2013.01); *G05D 2101/15* (2024.01); *G05D 2107/70* (2024.01); *G05D 2111/34* (2024.01)

(58) Field of Classification Search
CPC ............ G06K 7/10445; G06K 7/0008; G05D 1/2446; G05D 2101/15; G05D 2107/70; G05B 2219/31296; G05B 19/4185
See application file for complete search history.

(56) References Cited

U.S. PATENT DOCUMENTS

| | | |
|---|---|---|
| 2003/0093187 A1 | 5/2003 | Walker |
| 2009/0002163 A1* | 1/2009 | Farrington ......... G08B 13/2402 340/572.1 |
| 2016/0180126 A1 | 6/2016 | Saleem |

(Continued)

FOREIGN PATENT DOCUMENTS

| | | |
|---|---|---|
| EP | 4593370 A1 | 7/2025 |

OTHER PUBLICATIONS

Foreign Communication From a Related Counterpart Application, Extended EP Search Report and EP Search Opinion dated Jun. 30, 2025 EP Application No. 24223651.1

*Primary Examiner* — Vernal U Brown

(57) ABSTRACT

An autonomous appliance configured to operate in a facility. The autonomous appliance includes a chassis including a motor configured to move the autonomous appliance within the facility and a radio frequency identification (RFID) tag reader configured to communicate with infrastructure RFID tags attached to fixed infrastructure and with product RFID tags attached to product containers. The RFID tag reader emits an RF signal that provides ambient RF power to the infrastructure RFID tags and the product RFID tags. The autonomous appliance includes at least one actuator configured to manipulate the product containers and a controller coupled to the RFID tag reader and configured to read information from the infrastructure RFID tags and the product RFID tags. The controller adapts the behavior of the autonomous appliance relative to a first product container based on the read information.

20 Claims, 6 Drawing Sheets

(56)          References Cited

U.S. PATENT DOCUMENTS

2022/0012677 A1*   1/2022   Rongley ............ G06K 7/10297
2022/0414566 A1*   12/2022   Napoli ............. G06Q 10/06311
2023/0297952 A1*   9/2023   Butler ................ G06K 7/10366
                                                   235/385
2023/0347511 A1*   11/2023   High ..................... G05D 1/692

* cited by examiner

RFID Tag Data In ——→ Cybernetic Controller ——→ RFID Tag Data Out

Steering In ——→ ——→ Steering Out

Location ——→

Motor In ——→ ——→ Motor Out

Sensors ←——→

Actuators ←——→ ML Model

350

210

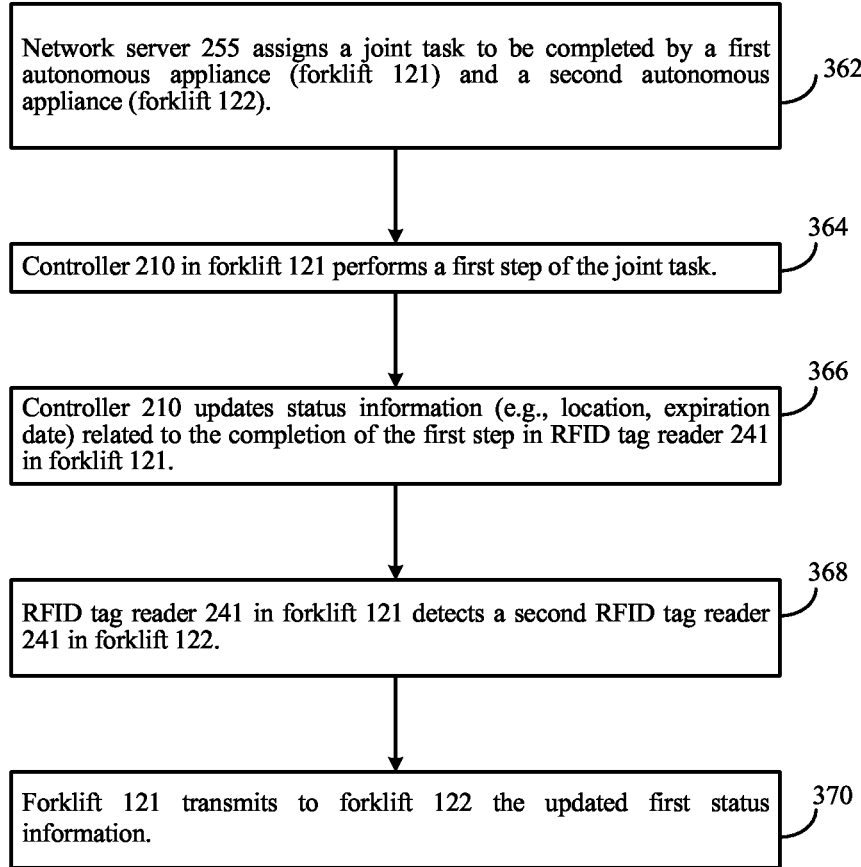

Network server 255 assigns a joint task to be completed by a first autonomous appliance (forklift 121) and a second autonomous appliance (forklift 122).  362

Controller 210 in forklift 121 performs a first step of the joint task.  364

Controller 210 updates status information (e.g., location, expiration date) related to the completion of the first step in RFID tag reader 241 in forklift 121.  366

RFID tag reader 241 in forklift 121 detects a second RFID tag reader 241 in forklift 122.  368

Forklift 121 transmits to forklift 122 the updated first status information.  370

FIG. 3C

PASSIVE RFID TAG PLACEMENT FOR CYBERNETIC COMMAND AND CONTROL VIA LOCALIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cybernetics is the science of human-machine interaction that involves feedback, control and communication. In engineering applications, cybernetics focuses on automatic control of dynamic systems, such as robots, aircraft, marine craft, automotive systems, electrical circuits, biological systems, process plants, and others. Cybernetics may involve systems of any nature that are capable of receiving, storing, and processing information that may be used to control a machine.

A cybernetic system uses feedback to control itself. The system processes information, responds to it, and changes for better functioning. Some of the most important applications of cybernetics are in the fields of machine learning and artificial intelligence. Artificial intelligence, or simply "AI", is one aspect of machine intelligence. AI is an area of computer science based on the idea of computer programs that model aspects of intelligent behavior. It seeks to create machines to mimic human intelligence and behavior so that the machines may react like humans.

Machine learning (ML) is a branch of AI that focuses on the use of data and algorithms to imitate the way that humans learn, gradually improving its accuracy. Using statistical methods, machine learning algorithms are trained to make classifications or predictions and to obtain insights in data mining.

There is a need for system and methods that provide improved environmental input data to ML/AI systems in order to improve the accuracy and functioning of cybernetic command and control over autonomous systems. There is a further need for peer-to-peer cybernetic control systems that enable joint task performance by autonomous appliances.

SUMMARY

In an embodiment, an autonomous appliance configured to operate in a facility is disclosed. The autonomous appliance includes a chassis including a motor configured to move the autonomous appliance within the facility and a radio frequency identification (RFID) tag reader configured to communicate with infrastructure RFID tags attached to fixed infrastructure in the facility and with product RFID tags attached to product containers stored in the facility. The RFID tag reader is further configured to emit an RF signal that provides ambient RF power to at least one of the infrastructure RFID tags and the product RFID tags. The autonomous appliance further includes at least one actuator configured to manipulate the product containers; and a controller coupled to the RFID tag reader and configured to read information from the infrastructure RFID tags and the product RFID tags. The controller adapts the behavior of the autonomous appliance relative to a first product container based on the read information.

In an embodiment, an autonomous appliance configured to operate in a facility is disclosed. The autonomous appliance includes a chassis including a motor configured to move the autonomous appliance within the facility; and a radio frequency identification (RFID) tag reader configured to communicate with infrastructure RFID tags attached to fixed infrastructure in the facility and with product RFID tags attached to product containers stored in the facility. The RFID tag reader is configured to emit an RF signal that provides ambient RF power to at least one of the infrastructure RFID tags and the product RFID tags. The autonomous appliance further includes at least one actuator configured to manipulate the product containers; and a controller coupled to the RFID tag reader and configured to read information from the infrastructure RFID tags and the product RFID tags and to store information to the infrastructure RFID tags and the product RFID tags, wherein the stored information includes location information and a time stamp stored in a first product RFID tag attached to a first product container.

In an embodiment, a method for controlling autonomous appliances configured to operate in a facility is disclosed. The method includes assigning by a server a joint task to be completed by a first autonomous appliance and a second autonomous appliance, performing by a first controller in the first autonomous appliance a first step of the joint task, and updating by the first controller first status information related to the completion of the first step in a first RFID tag in the first autonomous appliance. The method also includes detecting by an RFID tag reader in the first autonomous appliance a second RFID tag in the second autonomous appliance. Detecting the second RFID tag comprises emitting an RF signal that provides ambient RF power to the second RFID tag and transmitting to the second autonomous appliance the updated first status information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3C is a flow diagram of a method performed by autonomous appliances assigned to a joint task according to an embodiment of the disclosure.

DETAILED DESCRIPTION

Figure 1:
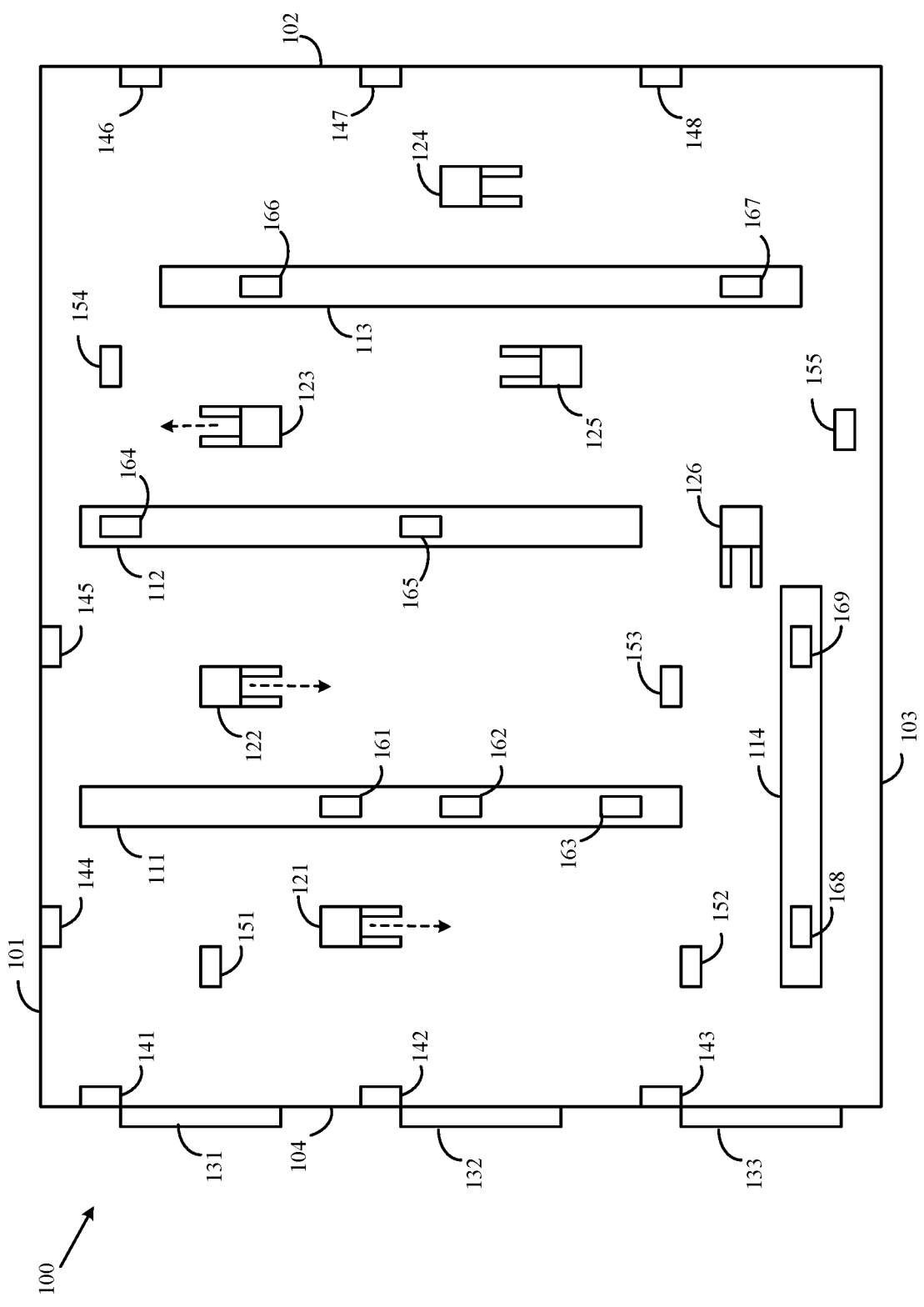
FIG. 1 is a topology diagram of a facility in which autonomous appliances operate under cybernetic control according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless identification (ID) tags respond to a radio frequency (RF) signal from a reader device by emitting an RF response signal. Typically, such tags harvest power from an ambient electromagnetic field. A wireless identification tag may emit an RF response signal in response to a signal comprising predetermined data. A wireless identification tag may also emit an RF response signal in response to detecting RF radiation in a predetermined RF frequency band. Some such wireless identification tags are referred to as RFID tags or as passive RFID tags. The modifying word 'passive' here indicates that the RFID tag does not initiate communication but is stimulated to communicate by receiving an electromagnetic power signal (e.g., ambient electromagnetic field) from an emitting power source, for example from an RFID reader/scanner device. The modifying word 'passive' also refers to the RFID tag not having an independent on-board power source such as a battery.

The systems and methods described herein relate to cybernetic control systems that incorporate artificial intelligence (AI) and/or machine learning (ML) systems, and RFID technology to control autonomous appliances (or autonomous systems). The cybernetic control systems enable dynamic task adaptation and precision control in the autonomous appliances. Example appliances may include robots, drones, vehicles, or any device configured to perform tasks with little or no human intervention. The AI/ML is used to process data from various sources, adapting to different environments and making real-time decisions based on the information gathered from RFID tags. In an embodiment, the autonomous appliances may comprise a chassis including a motor operable to move the autonomous appliance around within an environment or facility, for example in a warehouse. In an embodiment, the autonomous appliances may comprise an actuator configured to manipulate items in the environment, for example forks of a fork lift, robotic arms, and the like.

In an embodiment, an RFID reader/scanner is embedded in each of the autonomous appliances. This RFID reader/scanner provides an ambient electromagnetic field to enable RFID tags to harvest power and become active. The RFID reader/scanner also interacts communicatively with the RFID tags. In some cases, the communication interaction is one-way only: the RFID tag, when powered, emits information it has stored. In other cases, however, the communication interaction may be two-way, including the RFID reader/scanner transmitting information to the RFID tag to be stored (such as events related to a storage condition of the product associated with the RFID tag and/or locations of the RFID tag) by the RFID tag. The two-way communication may also involve sending commands to the RFID tag, whereby the RFID tag may respond by transmitting some but not all of the information it stores, where the RFID tag is configured to select from all its stored information a portion based on the command from the RFID reader/scanner.

When an autonomous appliance is granted access to perform a task, the autonomous appliance may scan its local area for specialized RFID tags from which to gather information necessary to perform the specific task. For instance, a pick and place robot operates differently in a various warehouse locations based upon the information lifted from local RFID tags. The robot may also use the RFID tags for precision steerage, guidance, and velocity control.

An autonomous appliance, such as a robot, reads information from an RFID tag and adapts its behavior relative to the product associated with that RFID tag based on the read information. For example, the location of the RFID tag may be stored in the tag and communicated to the robot. The robot can then adapt its behavior based on this location. In an embodiment, the robot can create a location system based on reading information from a plurality of RFID tags. The location system may take the form of a map or a map-like data artifact that represents locations of RFID tags and hence of articles associated with the RFID tags. In an embodiment, the location system is established by a plurality of autonomous appliances at the same location (e.g., in a warehouse) coordinating with each other to collate RFID tag location information to provide a complete map of locations of RFID tags within the environment. In an embodiment, the autonomous appliances share the RFID tag location information back to a computer or server within the location or at a centralized location separate from the place where the RFID tags are located, whereby the computer or server collates the RFID tag location information to create the location system and/or the map of locations of RFID tags/articles. In an embodiment, the RFID tag location information or map of locations of RFID tags may be transmitted back to the autonomous appliances. Thus, each autonomous appliance obtains a more comprehensive and complete map of locations of RFID tags/articles than it might be able to create on its own without collaboration with other autonomous appliances in the same environment.

The information the robot reads from the RFID tag can be an expiration date, and the robot may pick a product associated with an RFID tag indicating an earlier expiration date instead of another product associated with an RFID tag indicating a later expiration date. The information read by the robot may constitute instructions of how to handle the product associated with the RFID tag, such as "don't shake", "don't leave in an unstable temperature environment", "pick-up from bottom and not from sides", and the like. The robot or autonomous appliance can write to the RFID tag to update a location of the product associated with the RFID tag. Preferably, the robot has built-in RFID tag reader/writer capability. The autonomous appliance may have a modest processor such as a microcontroller. The system may include a plurality of autonomous appliances that intercommunicate with each other to coordinate accomplishment of a shared task. In this way, the handling of products or other items can be improved and made more efficient.

The autonomous appliances can take action autonomously based on the information each appliance stores locally. The autonomous appliances may be communicatively coupled to a communication network and therethrough to a central control entity and/or to other autonomous appliances. The autonomous appliance may take some actions autonomously while still acting in response to commands, for example commands from a computer system or server. The commands the autonomous appliance receives may be high-level commands, such as "move 100 instances of product Y to loading dock Z." The autonomous appliance may act upon this high-level command by autonomously determining where to pick the 100 instances of product Y based on its knowledge of locations of RFID tags in the environment and determine what route to take to get to the current location of the 100 instances of product Y and what route to take to move the 100 instances of product Y to loading dock Z, while avoiding collisions with other autonomous appliances that may be moving about within the environment at the same time. In an embodiment, the autonomous appliances rely upon AI and ML processes and/or algorithms embedded in the autonomous appliances to make decisions, find RFID tags and associated items, and route movement within the environment.

In an embodiment, the plurality of autonomous appliances may be assigned, by a server computer, a joint task to be performed, for example where the plurality of autonomous appliances share the activity of the joint task. This may take the form of different ones of the autonomous appliances doing different steps. For example, a first autonomous appliance may locate items based on RFID tags affixed to the items and move a pallet of these items out into a pathway in a warehouse. A second autonomous appliance may pick-up the pallet of these items and move the pallet to a proximity of a loading dock. A third autonomous appliance may pick-up the pallet and load it into a delivery truck. This may take the form of some of the autonomous appliances doing portions of a given step of the joint task. For example, two separate autonomous appliances may cooperate to locate and move pallets of items into a pathway; five separate autonomous appliances may cooperate to pick-up pallets and transport them to the proximity of the loading dock; three separate autonomous appliances may cooperate to pick-up the pallets and load them into the delivery truck. The plurality of autonomous appliances may report the progress and/or status of their own activities to each other and to the server computer, whereby the joint task can be coordinated among the autonomous appliances and by the server computer. This can involve the autonomous appliances reading the RFID tags affixed to the items. This can involve the autonomous appliances writing event information to the RFID tags, for example information about time of movement within the warehouse, environmental conditions (temperature, humidity, etc.) within the warehouse, handling information (maximum acceleration and direction of this acceleration).

By collaborating in this way in completing a joint task, the task can be completed more efficiently and promptly than otherwise might be the case. Additionally, empowering autonomous appliances can make the system more efficient and free of accidents. For example, the autonomous appliances can dynamically adapt their behaviors based on AI/ML processing and take action timely.

Turning now to FIG. 1, a topology diagram of facility 100 in which autonomous systems operate under cybernetic control is described according to an embodiment of the disclosure. In the example embodiment, facility 100 may be, for example, a warehouse 100 for storing inventories of different types of products. Facility 100 includes numerous shelving units, including shelving units 111-114, each of which has multiple shelves that hold products. According to the principles of the present disclosure, the facility 100 includes multiple autonomous appliances (or robots) that perform tasks with little or no human intervention. In the example, the autonomous appliances comprise autonomous forklifts 121-126. However, this is by way of example only and should not be construed to limit the scope of the disclosure of the claims herein. In alternate embodiments, the autonomous appliances may include autonomous cleaning machines that sweep, vacuum, and/or wash the floors of facility 100. In still other embodiments, the facility 100 may comprise an office space or manufacturing plant and the autonomous appliances may comprise autonomous carts that deliver mail, supplies, and/or equipment between offices or stations in the facility 100.

Facility 100 includes four exterior walls 101-104. Wall 104 includes three doors 131-133 through which products may be received or transferred out. For example, trucks or other vehicles may back up to doors 131-133 and either receive products from the facility 100 or deliver products to the facility 100. The forklifts 121-126 are able to navigate and maneuver through the facility 100 with the assistance of sensors (e.g., sonar, radar, LiDAR, cameras, RFID readers, etc.) in the forklifts 121-126 and RFID tags mounted on architectural features throughout the facility 100.

The RFID tags may include both read-only RFID tags and read/write RFID tags. Additionally, at least some of the RFID tags may be "smart" RFID tags that include low-power microprocessors and memories that enable the smart RFID tags to execute instructions, transmit data to and receive data from other autonomous appliances, and/or a local wireless network. When a forklift is assigned or enabled to perform a task in the facility 100, the forklift uses a built-in RFID reader to scan for nearby RFID tags. The cybernetic control system of the forklift uses its built-in AI/ML to retrieve and interpret information stored in the RFID tag. The retrieved information may include task instructions, optimal path information for navigating the facility 100, speed adjustments, and other environmental factors.

In FIG. 1, example smart RFID tags may include wall-mounted RFID tags 141-148, floor-mounted RFID tags 151-155, and shelf-mounted RFID tags 161-169. These RFID tags are strategically placed in the facility 100 where the autonomous appliances (i.e., forklifts) operate. The RFID tags are encoded with specific information related to the location, task requirements, and other relevant parameters. Each tag serves as a data source that the AI system can access to tailor its behavior.

By way of example, forklift 121 may use radar and LiDAR sensors to detect wall 104, shelving unit 111, and other forklifts in order to avoid collisions with them. Forklift 121 may also use an on-board RFID reader to detect and to read wall-mounted RFID tags 141-143 on wall 101, floor-mounted RFID tags 151 and 152, and shelf mounted RFID tags 161-163 on shelving unit 111. The RFID reader may also read RFID tags (not shown) on products that are placed on the shelves of the shelving unit 111.

The present disclosure describes various interactions between an autonomous appliance and RFID tags affixed to products or building infrastructure. An autonomous appliance, such as a robot, may read information from an RFID tag and adapt its behavior relative to the product associated with that RFID tag based on the read information. For example, the location of the RFID tag may be stored in the tag and communicated to the autonomous appliance. The autonomous appliance can then adapt its behavior based on the location.

Alternatively, the read information may include path information associated with the facility and steering and velocity information for controlling movement of the autonomous appliance. In this manner, the autonomous appliance may navigate from a starting point to a destination point without colliding with the infrastructure of the facility.

In an embodiment, the read information may include an expiration date. In response, the autonomous appliance may adapt its behavior by picking a first product associated with an RFID tag indicating an earlier expiration date instead of a second product associated with an RFID tag indicating a later expiration date.

The information read by the autonomous appliance may include instructions regarding the handling of the product associated with the RFID tag. For example, the read information may include a vibration requirement value (or maximum vibration threshold) associated with a product in the first product container. The autonomous appliance may adapt its behavior to limit the amount of shaking the first product container experiences. Alternatively, the instructions regarding handling may inform the autonomous appliance to manipulate the first product container in a certain manner, such as by picking up the first product container only from the bottom or only from the sides, or the like.

The information read by the autonomous appliance may include a temperature requirement value (e.g., maximum and/or minimum temperature thresholds) associated with a product in the first product container. The autonomous appliance may adapt its behavior to limit the temperature swings that the first product container experiences, such as by storing the first product container in an air-conditioned environment.

By way of example, the forklift 121 may use the RFID tags to determine its own location within the facility 100, to receive data regarding products on nearby shelves as the forklift 121 passes the shelves, and to receive instructions that may be used by a cybernetic controller in forklift 121 to adapt or change the operation of forklift 121. For instance, the forklift 121 may read RFID tag 142 and determine that it is located at or near door 132 and that door 132 is a receiving and loading bay. The RFID tag instructions may cause the forklift 121 to move products between different locations in the facility 100. The AI/ML system in forklift 121 uses the information from the RFID tags to adapt its behavior to the specific task and environment. As the forklift 121 interacts with different RFID tags, the forklift 121 collects data and learns from the operations it performs and the interactions it experiences.

Figure 2:
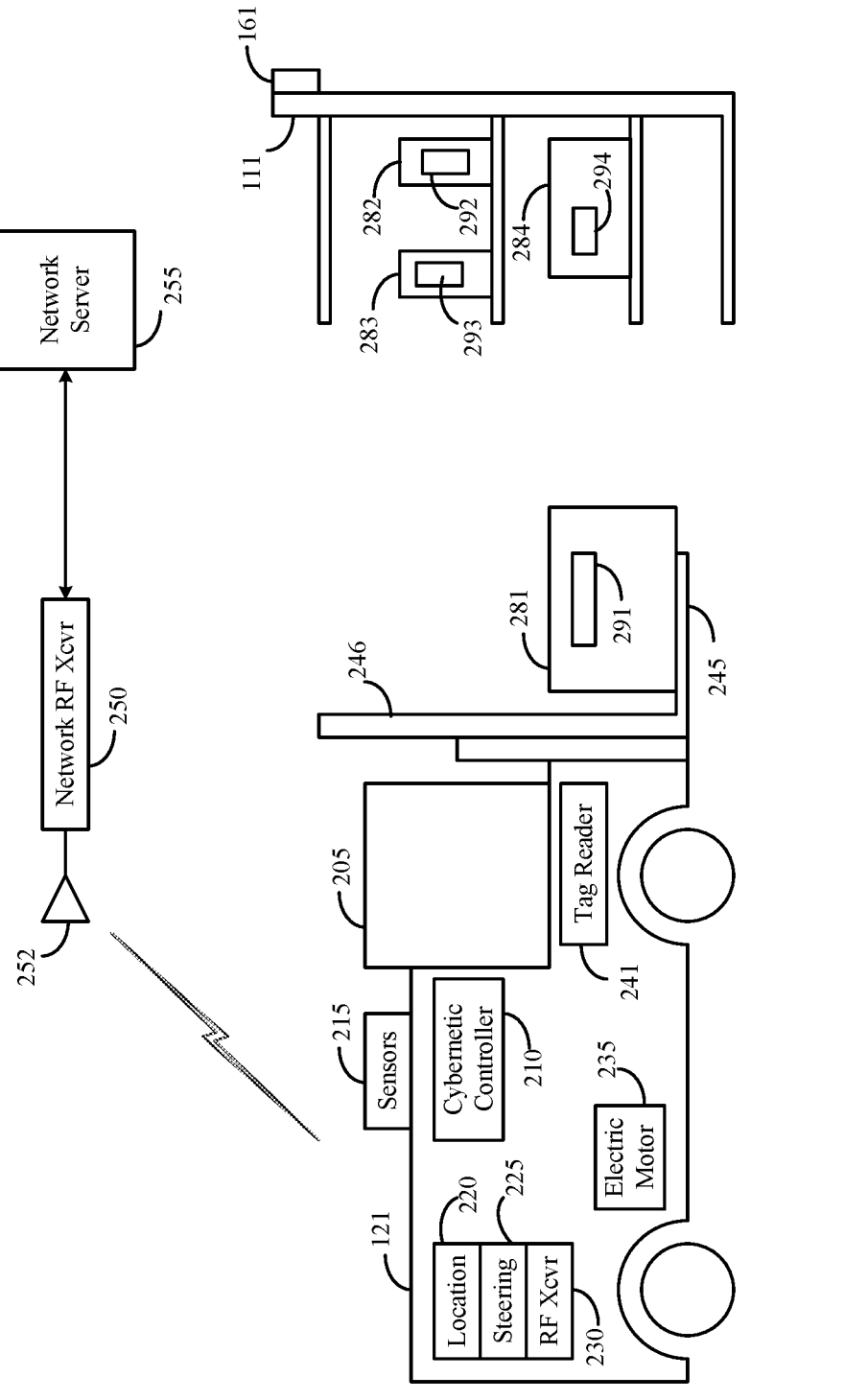
FIG. 2 is a diagram of an example autonomous appliance according to an embodiment of the disclosure.

FIG. 2 is a diagram of an example autonomous appliance according to an embodiment of the disclosure. In the example embodiment, the autonomous appliance comprises the forklift 121. Forklift 121 comprises a cybernetic controller 210, one or more sensors 215, a location system 220 (e.g., GPS system), a steering controller 225, a radio frequency (RF) transceiver (Xcvr) 230, an electric motor 235, and an RFID tag reader 241. Forklift 121 may optionally include a cab 205 in which a human operator may be located when the forklift 121 is being operated in manual mode.

At the front of forklift 121, one or more actuator(s) may be mounted to grasp and manipulate containers in the facility 100. In the specific example of a forklift 121, the actuator comprises the lifting forks 245 and the mast assembly 246 on which the forks 245 are mounted. However, in alternate embodiments, such as a robotic device, the actuators may comprise electromechanical arms configured to grasp and lift containers. In other embodiments, such as a floor sweeper, the actuators may comprise rotating brushes.

The facility 100 includes a network RF transceiver 250 and antenna 252 that provide wireless communication links between a network server 255 and the autonomous appliances in facility 100. This includes wireless communications between RF transceiver 250 and RF transceiver 230 in forklift 121. According to the principles of the present disclosure, the cybernetic controller 210 uses RF transceiver 230 to wirelessly communicate with the network server 255. This enables the cybernetic controller 210 to receive task assignments from the network server 255 and to report task status information back to the network server 255.

Additionally, the cybernetic controller 210 may use RF transceiver 230 to communicate peer-to-peer with other autonomous appliances in facility 100. RF transceiver 230 may comprise any conventional RF transceiver technology, including a WiFi transceiver or a Bluetooth transceiver, among others. In addition to communicating via RF transceiver 230, the cybernetic controller 210 may communicate with another cybernetic controller 210 in a second autonomous appliance using the RFID tag readers 241 in the forklift 121 and the second autonomous appliance. Advantageously, the RF transceiver capabilities enable the cybernetic controller 210 to share task status information with other autonomous appliances, thereby enabling the forklift 121 to engage in collaborative task operations with the other appliances.

The cybernetic controller 210 maintains overall control of the forklift 121. By way of example, the cybernetic controller 210 controls the operation of the electric motor 235, enabling the cybernetic controller 210 to control the speed and the direction (forward, reverse) of the forklift 121. The cybernetic controller 210 also controls the steering system 225 which, in turn, controls the orientation of the wheels of the cybernetic controller 210, enabling the cybernetic controller 210 to steer the forklift 121 to the left or to the right.

The cybernetic controller 210 can receive precise location information from location system 220, which may be a GPS controller or a radar sensing and controlled system that receives location information from the server 235 or another apparatus. The cybernetic controller 210 also may receive location information and/or objection position information from sensors 215. By way of example, sensors 215 may include one or more LiDAR sensors, one or more radar sensors, one or more sonar sensors, and multiple infrared cameras or visible light cameras. In this manner, the cybernetic controller 210 may detect the walls 101-104 of the facility 100 and the shelving units 111-114. In FIG. 2, for example, the sensors 215 may detect the presence of the shelving unit 111 in front of the forklift 121. This enables the cybernetic controller 121 to steer to avoid the shelving unit 111 or to slowly approach the shelving unit 111 in order to place the product container 281 on the forks 245 on one of the shelves on shelving unit 111.

The cybernetic controller 210 may also use the RFID tag reader 241 to detect the presence of shelving unit 111 by detecting a response signal from the RFID tag 161 mounted on the shelving unit 111. In an example embodiment, the RFID tag reader 241 may include an embedded read/write RFID tag containing identification (ID) data and status information related to forklift 121. The embedded RFID tag enables the RFID tag readers of other autonomous appliances in facility 100 to detect the nearby presence of forklift 121 and to exchange ID and status information with each other.

In FIG. 2, the forklift 121 is transporting a product container 281, which includes an RFID tag 291 mounted on an exterior surface of the product container 281. Additional product containers are placed on the shelves of shelving unit 111. Product container 283 includes RFID tag 293, product container 282 includes RFID tag 292, and product container 284 includes RFID tag 294. The read information stored in the RFID tag 161 and RFID tags 291-294 may include path information, expiration dates, handling instructions, temperature requirement values, associated with a product in a product container 281-284. According to the principles of the present disclosure, the forklift 121 may adapt its behavior based on the information stored in the RFID tags 291-294.

Figure 3A:
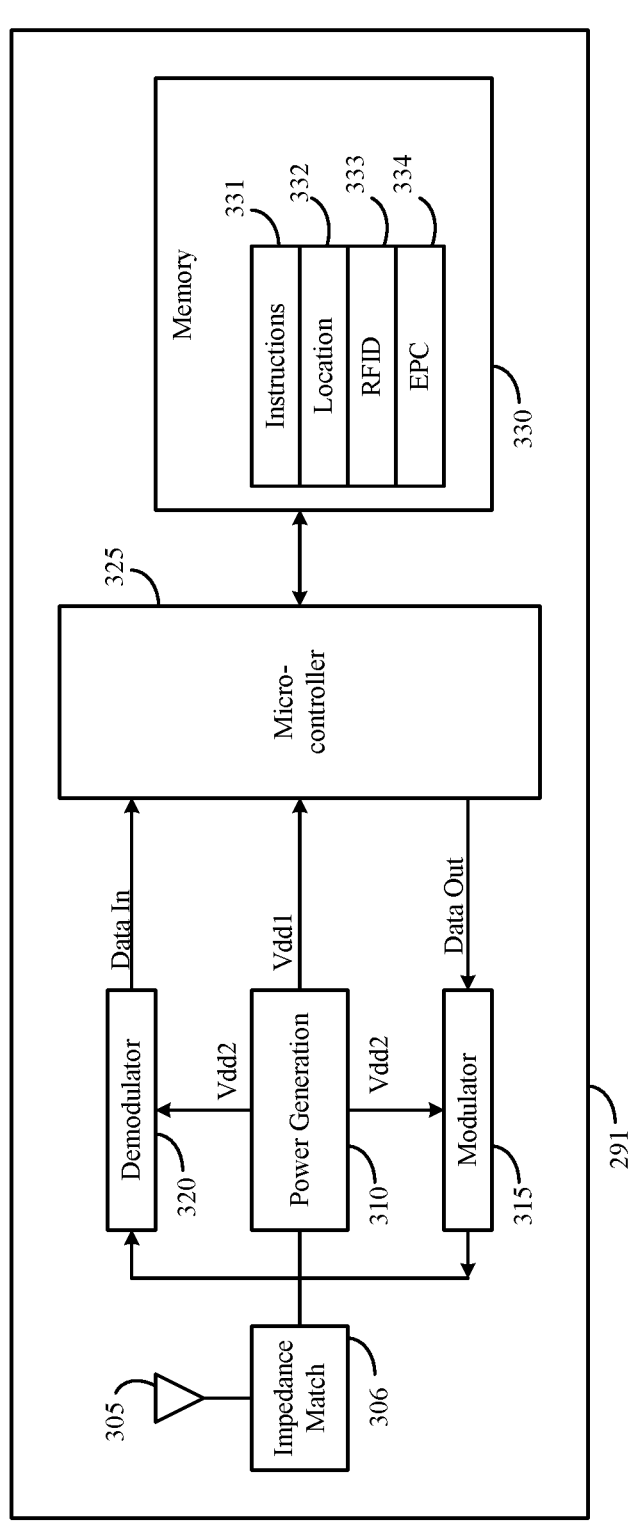
FIG. 3A is a diagram of a smart RFID tag according to an embodiment of the disclosure.

FIG. 3A is a diagram of an example smart RFID tag 291 according to an embodiment of the disclosure. RFID tag 291 includes an antenna 305, an impedance matching circuit 306, a power generation circuit 310, a demodulator 320, a modulator 315, a microcontroller 325, and a memory 330. The memory 330 may store, among other things, instruction 331 location data 332, a unique RFID value 333 associated with RFID tag 291 and an electronic product code (EPC) 334.

Power generation circuit 310 receives the incoming RF signal from impedance matching circuit 306 and converts the ambient RF power into a DC voltage (Vdd2) that provides DC power to demodulator 320, modulator 315, microcontroller 325 and memory 330. The demodulator 320 also receives the incoming RF signal from impedance matching circuit 306, detects the information signal transmitted by the RFID tag reader 241 and down-converts the RF signal to a Data In stream that is read by microcontroller 325. Microcontroller 325 may store the Data In information in memory 330 and execute any instructions in the Data In stream. Microcontroller 325 is also configured to send a Data Out stream to modulator 315. Modulator 315 up-converts the Data In stream to an outgoing RF signal that is transmitted via antenna 305 to the RFID tag reader 241 in forklift 121.

In the example in FIG. 2, the ambient RF power harvested by the power generation circuit 310 may be provided by the RF signal transmitted by the RFID tag reader 241. However, this is by way of example only and should not be construed to limit the scope of the disclosure. In other embodiments, the incoming RF signal may be provided by an RFID tag reader in another autonomous appliance that emits a radio signal. In still other embodiments, the incoming RF signal may be provided at least in part by a stationary RF situated in the facility 100 instead of by an RFID tag reader disposed in an autonomous appliance.

Figure 3B:
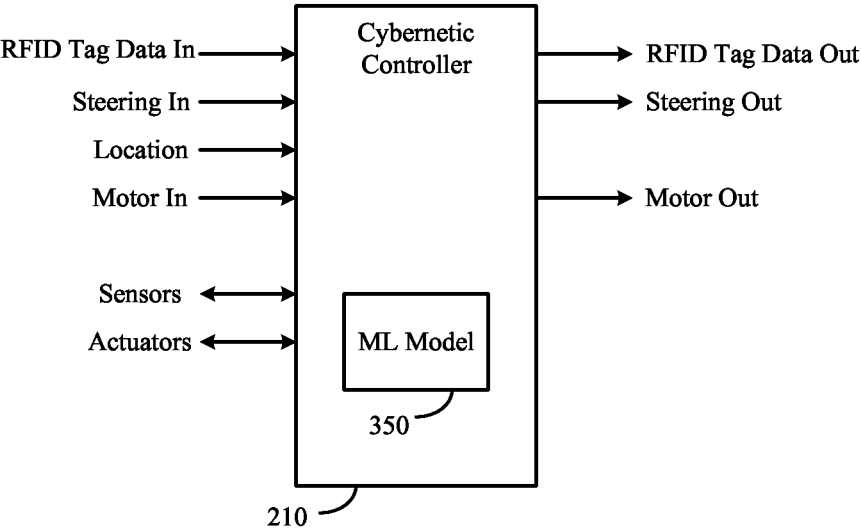
FIG. 3B is a diagram of the input and output signals of a cybernetic controller according to an embodiment of the disclosure.

FIG. 3B is a diagram of the input and output signals of a cybernetic controller 210 according to an embodiment of the disclosure. In the example embodiment, the cybernetic controller 210 may optionally include a machine learning (ML) model 350 that enables the cybernetic controller 210 to learn from repetitive tasks that are used to train the ML model 350. This ML capability enables the cybernetic controller 210 to make decisions independently of other autonomous appliances and the network server 255. Cybernetic controller 210 receives RFID Tag Data In from the RFID tag reader 241 and transmits RFID Tag Data Out to the RFID tag reader 241. The cybernetic controller 210 receives Steering In data (e.g., status information) from the steering system 225 and transmits Steering Out data (e.g., commands) to control the operation of the steering system 225. Similarly, the cybernetic controller 210 receives Motor In data from the electric motor 235 and transmits Steering Out data (commands) to control the operation of the electric motor 235.

The cybernetic controller 210 also receives from sensors 215 environmental data about its surroundings. The environmental data may include images from cameras and distance and direction data from a LiDAR system, a radar system, and/or a sonar system. The cybernetic controller 210 also communicates with actuators in the forklift 121 in order to control the movement of the forks 245. For example, after the forks are placed under product container 291, the cybernetic controller 210 may command the mast 246 to lift the forks vertically in order to transport the product container 291 from an origination point to a destination point.

FIG. 3C is a flow diagram of a collaborative task performed by autonomous appliances according to an embodiment of the disclosure. In the example in FIG. 3C, the collaborative task enables control of multiple autonomous appliances configured to operate in facility 100. In step 362, the network server 255 assigns a joint task to be completed by a first autonomous appliance (e.g., forklift 121) and a second autonomous appliance (e.g., forklift 122). In step 364, controller 210 in forklift 121 performs a first step of the joint task. By way of example, forklift 121 may place a first product container 281 on shelving unit 111 and may record an expiration date for a product in the first product container 281.

In step 366, controller 210 updates status information (e.g., location, expiration date) related to the completion of the first step in RFID tag reader 241 in forklift 121. In step 368, the RFID tag reader 241 in forklift 121 detects a second RFID tag reader 241 in the forklift 122. In step 370, forklift 121 transmits to forklift 122 the updated first status information. At this point, the controller 210 in forklift 122 is aware of the location and the expiration date of the product container 281. Thereafter the cybernetic controller 210 in forklift 122 may adapt its behavior based on the updated status information. By way of example, forklift 122 may divert itself to pick up the product container 281 from the shelving unit 111 instead of a second product container with a later expiration date.

Figure 4:
FIG. 4 is a block diagram of a cybernetic controller according to an embodiment of the disclosure.
Figure 4:
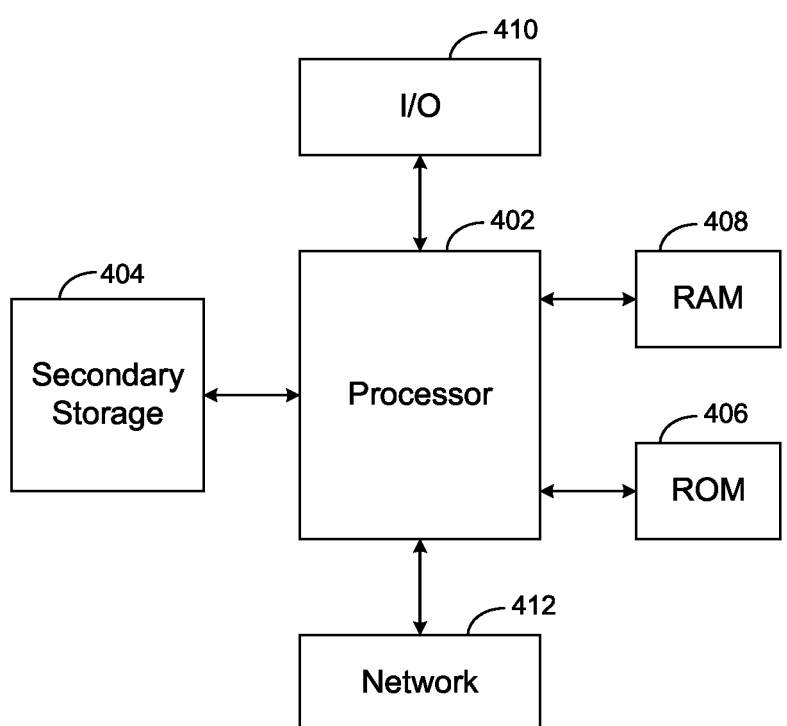

FIG. 4 is a block diagram of a cybernetic controller according to an embodiment of the disclosure. In particular, FIG. 4 illustrates a computer system 400 that may be embodied in the cybernetic controller 210 for implementing one or more embodiments disclosed herein. The computer system 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips.

It is understood that by programming and/or loading executable instructions onto the computer system 400, at least one of the CPU 402, the RAM 408, and the ROM 406 are changed, transforming the computer system 400 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 400 is turned on or booted, the CPU 402 may execute a computer program or application. For example, the CPU 402 may execute software or firmware stored in the ROM 406 or stored in the RAM 408. In some cases, on boot and/or when the application is initiated, the CPU 402 may copy the application or portions of the application from the secondary storage 404 to the RAM 408 or to memory space within the CPU 402 itself, and the CPU 402 may then execute instructions that comprise the application. In some cases, the CPU 402 may copy the application or portions of the application from memory accessed via the network connectivity devices 412 or via the I/O devices 410 to the RAM 408 or to memory space within the CPU 402, and the CPU 402 may then execute instructions that the application is comprised of. During execution, an application may load instructions into the CPU 402, for example load some of the instructions of the application into a cache of the CPU 402. In some contexts, an application that is executed may be said to configure the CPU 402 to do something, e.g., to configure the CPU 402 to perform the function or functions promoted by the subject application. When the CPU 402 is configured in this way by the application, the CPU 402 becomes a specific purpose computer or a specific purpose machine.

The secondary storage 404 is typically comprised of one or more disk drives or tape drives and is used for non-volatile storage of data and as an over-flow data storage device if RAM 408 is not large enough to hold all working data. Secondary storage 404 may be used to store programs which are loaded into RAM 408 when such programs are selected for execution. The ROM 406 is used to store instructions and perhaps data which are read during program execution. ROM 406 is a non-volatile memory device which typically has a small memory capacity relative to the larger memory capacity of secondary storage 404. The RAM 408 is used to store volatile data and perhaps to store instructions. Access to both ROM 406 and RAM 408 is typically faster than to secondary storage 404. The secondary storage 404, the RAM 408, and/or the ROM 406 may be referred to in some contexts as computer readable storage media and/or non-transitory computer readable media.

I/O devices 410 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. In particular, network connectivity devices 412 may include RFID reader 111 in user device 110. The network connectivity devices 412 may provide wired communication links and/or wireless communication links (e.g., a first network connectivity device 412 may provide a wired communication link and a second network connectivity device 412 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 412 may enable the processor 402 to communicate with the Internet or one or more intranets. With such a network connection, it is contemplated that the processor 402 might receive information from the network, or might output information to the network in the course of performing the above-described method steps. Such information, which is often represented as a sequence of instructions to be executed using processor 402, may be received from and outputted to the network, for example, in the form of a computer data signal embodied in a carrier wave.

Such information, which may include data or instructions to be executed using processor 402 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 402 executes instructions, codes, computer programs, scripts which it accesses from hard disk, floppy disk, optical disk (these various disk-based systems may all be considered secondary storage 404), flash drive, ROM 406, RAM 408, or the network connectivity devices 412. While only one processor 402 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 404, for example, hard drives, floppy disks, optical disks, and/or other device, the ROM 406, and/or the RAM 408 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly bound to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 400, at least portions of the contents of the computer program product to the secondary storage 404, to the ROM 406, to the RAM 408, and/or to other non-volatile memory and volatile memory of the computer system 400. The processor 402 may process the executable instructions and/or data structures in part by directly accessing the computer program product, for example by reading from a CD-ROM disk inserted into a disk drive peripheral of the computer system 400. Alternatively, the processor 402 may process the executable instructions and/or data structures by remotely accessing the computer program product, for example by downloading the executable instructions and/or data structures from a remote server through the network connectivity devices 412. The computer program product may comprise instructions that promote the loading and/or copying of data, data structures, files, and/or executable instructions to the secondary storage 404, to the ROM 406, to the RAM 408, and/or to other non-volatile memory and volatile memory of the computer system 400.

In some contexts, the secondary storage 404, the ROM 406, and the RAM 408 may be referred to as a non-transitory computer readable medium or a computer readable storage media. A dynamic RAM embodiment of the RAM 408, likewise, may be referred to as a non-transitory computer readable medium in that while the dynamic RAM receives electrical power and is operated in accordance with its design, for example during a period of time during which the computer system 400 is turned on and operational, the dynamic RAM stores information that is written to it. Similarly, the processor 402 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of controlling autonomous appliances configured to operate in a facility, the method including:

assigning by a server a joint task to be completed by a first autonomous appliance and a second autonomous appliance;

performing by a first controller in the first autonomous appliance a first step of the joint task;

updating by the first controller first status information related to completion of the first step in a first RFID tag in the first autonomous appliance;

detecting by an RFID tag reader in the first autonomous appliance a second RFID tag in the second autonomous appliance, wherein detecting the second RFID tag comprises emitting an RF signal that provides ambient RF power to the second RFID tag; and transmitting to the second autonomous appliance the updated first status information.

2. The method of claim 1, further including:

adapting by a second controller in the second autonomous appliance an operation of the second autonomous appliance based on the updated first status information.

3. The method of claim 2, further including:

performing by the second controller in the second autonomous appliance a second step of the joint task;

updating by the second controller second status information related to completion of the second step in the second RFID tag in the second autonomous appliance; and detecting by an RFID tag reader in the second autonomous appliance the first RFID tag in the first autonomous appliance and transmitting to the first autonomous appliance the updated second status information.

4. An autonomous appliance configured to operate in a facility, the autonomous appliance including:

a chassis including a motor configured to move the autonomous appliance within the facility;

a radio frequency identification (RFID) tag reader configured to communicate with infrastructure RFID tags attached to fixed infrastructure in the facility and with product RFID tags attached to product containers stored in the facility, wherein the RFID tag reader is configured to emit an RF signal that provides ambient RF power to at least one of the infrastructure RFID tags and the product RFID tags;

at least one actuator configured to manipulate the product containers; and a controller coupled to the RFID tag reader and configured to read information from the infrastructure RFID tags and the product RFID tags and to store information to the infrastructure RFID tags and the product RFID tags, wherein the stored information includes a time stamp corresponding to a location of a respective product RFID tag within the facility and environmental conditions of the facility for an area in which a respective infrastructure RFID tag or product RFID tag is located.

5. The autonomous appliance of claim 4, wherein the controller stores the stored information to the first product RFID tag when the autonomous appliance moves the first product container from a first location in the facility to a second location in the facility.

6. The autonomous appliance of claim 4, wherein the stored information adapts a behavior of a second autonomous appliance relative to the first product container when the second autonomous appliance reads the stored information.

7. The autonomous appliance of claim 6, wherein the second autonomous appliance adapts an operation of the second autonomous appliance to modify an orientation of the first product container based on the stored information.

8. The autonomous appliance of claim 6, wherein the second autonomous appliance adapts an operation of the second autonomous appliance to modify a handling operation of the first product container based on the stored information.

9. The autonomous appliance of claim 6, wherein the second autonomous appliance adapts at least one of a speed and a direction of the second autonomous appliance as the second autonomous appliance moves through the facility based on the stored information.

10. The autonomous appliance of claim 6, wherein the autonomous appliance comprises a robot.

11. The autonomous appliance of claim 6, wherein the autonomous appliance comprises a robot forklift.

12. An autonomous appliance configured to operate in a facility, the autonomous appliance including:
   a chassis including a motor configured to move the autonomous appliance within the facility;
   a radio frequency identification (RFID) tag reader configured to communicate with infrastructure RFID tags attached to fixed infrastructure in the facility and with product RFID tags attached to product containers stored in the facility, wherein the RFID tag reader is configured to emit an RF signal that provides ambient RF power to at least one of the infrastructure RFID tags and the product RFID tags;
   at least one actuator configured to manipulate the product containers; and
   a controller coupled to the RFID tag reader and configured to:

read information from the infrastructure RFID tags and the product RFID tags, wherein the controller adapts a behavior of the autonomous appliance relative to a first product container based on the read information; and
   store information to the infrastructure RFID tags and the product RFID tags, wherein the stored information includes a time stamp corresponding to a location of a respective product RFID tag within the facility and environmental conditions of the facility for an area in which a respective infrastructure RFID tag or product RFID tag is located.

13. The autonomous appliance of claim 12, wherein the autonomous appliance moves the first product container from a first location in the facility to a second location in the facility based on the read information.

14. The autonomous appliance of claim 12, wherein the controller adapts an operation of the at least one actuator to modify an orientation of the first product container based on the read information.

15. The autonomous appliance of claim 12, wherein the controller adapts an operation of the at least one actuator to modify a handling operation of the first product container based on the read information.

16. The autonomous appliance of claim 12, wherein the controller adapts at least one of a speed and a direction of the autonomous appliance as the autonomous appliance moves through the facility based on the read information.

17. The autonomous appliance of claim 12, wherein the read information includes:
   a location of a first infrastructure RFID tag;
   path information associated with the facility;
   steering and velocity information for controlling the autonomous appliance;
   an expiration date associated with a product in the first product container;
   a temperature requirement value associated with a product in the first product container;
   a vibration requirement value associated with a product in the first product container; or
   a handling requirement value associated with a product in the first product container.

18. The autonomous appliance of claim 12, wherein the autonomous appliance comprises a robot.

19. The autonomous appliance of claim 12, wherein the autonomous appliance comprises a robot forklift.

20. The autonomous appliance of claim 12, wherein the controller includes a machine learning model and the controller used the machine learning model to adapt the behavior of the autonomous appliance.

* * * * *